United States Patent [19]

Dresser

[11] Patent Number: 5,357,556
[45] Date of Patent: Oct. 18, 1994

[54] SYSTEM AND METHOD FOR TELEPHONE NETWORK TESTING

[75] Inventor: Stephen A. Dresser, Norwalk, Calif.

[73] Assignee: Pacific Bell, San Francisco, Calif.

[21] Appl. No.: 927,333

[22] Filed: Aug. 10, 1992

[51] Int. Cl.$^5$ .................. H04M 3/22; H04M 3/26; H04M 3/30

[52] U.S. Cl. .................. 379/27; 379/29; 379/30; 379/31

[58] Field of Search .......... 379/27, 29, 30, 31, 379/1, 5, 6, 22, 24

[56] References Cited

U.S. PATENT DOCUMENTS

| | | |
|---|---|---|
| 4,373,121 | 2/1983 | Sartori et al. . |
| 4,396,809 | 8/1983 | Brunssen . |
| 4,453,049 | 6/1984 | Daniels et al. .......... 379/27 X |
| 4,529,847 | 7/1985 | DeBalko . |
| 4,626,632 | 12/1986 | Mazz . |
| 4,685,120 | 8/1987 | Norris et al. . |
| 4,827,497 | 5/1989 | Norris et al. . |
| 4,832,192 | 5/1989 | De Luca et al. . |
| 4,852,145 | 7/1989 | Bevers et al. .......... 379/27 |
| 4,924,489 | 5/1990 | Lawerence et al. .......... 379/6 |
| 5,018,184 | 5/1991 | Abrams et al. .......... 379/6 X |
| 5,063,585 | 11/1991 | Shapiro . |
| 5,073,919 | 12/1991 | Hagensick .......... 379/6 X |
| 5,195,124 | 3/1993 | Ishioka .......... 379/27 |
| 5,218,616 | 6/1993 | Stephens .......... 379/27 |

Primary Examiner—Stephen Chin
Assistant Examiner—Paul Loomis
Attorney, Agent, or Firm—Merchant, Gould, Smith, Edell, Welter & Schmidt

[57] ABSTRACT

A system and method for testing equipment in a telephone network is disclosed for remote maintenance and verification of subscriber loops. The system and method accommodates known AC and DC fault testing techniques while improving reliability by providing duplex verification of the subscriber loop identification.

18 Claims, 5 Drawing Sheets

SYSTEM AND METHOD FOR TELEPHONE NETWORK TESTING

BACKGROUND OF THE INVENTION

1. Field of the Invention

This invention relates generally to a system and method for testing equipment in a telephone network, and more particularly, to a system and method for remote maintenance and verification of a subscriber loop in a telephone system.

2. Description of Related Art

In the not so distant past, the provider of local phone services not only provided services but also owned and operated the entire network, including the individual subscriber loops and equipment installed in residences and businesses. If a subscriber had a problem, they would contact the provider regardless of the source of the problem. This one-step approach was eliminated with the divestiture of the phone company.

From the phone company's standpoint, determination of whether a problem exists on the network side or the subscriber side is labor-intensive and costly. The problems associated with the determination were mitigated by establishing a demarcation point between the network and the subscriber and installing therebetween a diagnostic device known as a Maintenance Termination Unit (MTU). The MTU is a two-port device which isolates the network and the subscriber loop and has a certain electrical "signature". From the MTU signature, the phone company can estimate whether a resistive or open circuit fault lies within the network or the subscriber loop.

Tests such as the Local Test Desk (LTD) or the Mechanized Loop Tester (MLT) provide means for activating and interpreting the MTU signature to determine whether the problem experienced is the responsibility of the provider or the subscriber.

Figure 1:
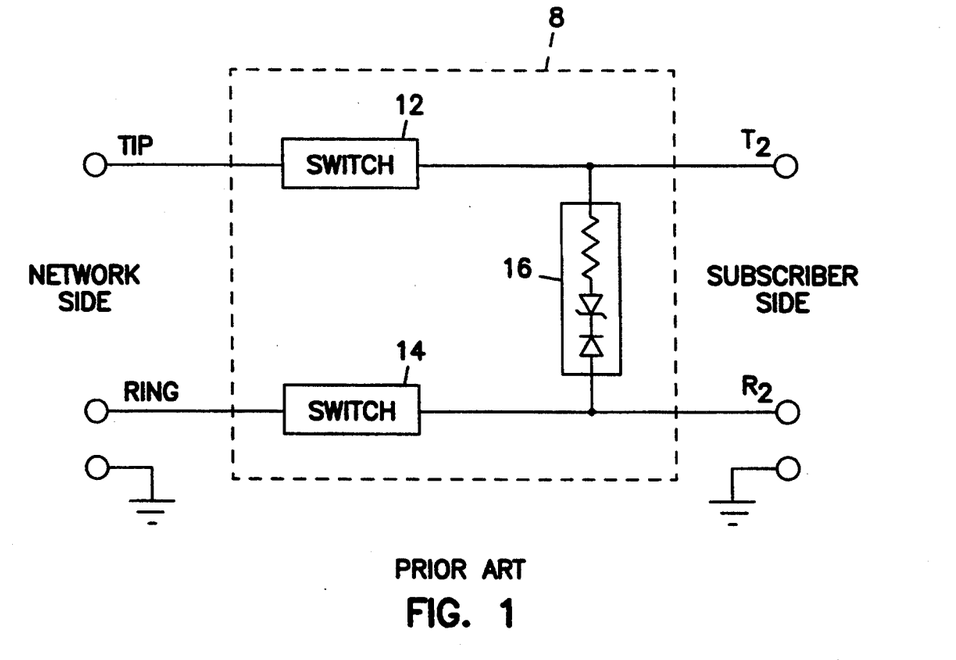
FIG. 1 is a prior art schematic diagram of a maintenance termination unit as applied in a plain old telephone service.

Reference is made to FIG. 1 which depicts a MTU 8 as applied in a Plain Old Telephone Service (POTS). The MTU 8 comprises a first voltage sensitive switch 12, a second voltage sensitive switch 14, and a DC signature impedance 16. The first voltage sensitive switch 12 interrupts the tip conductor between the network side and the subscriber side while the second voltage sensitive switch 14 interrupts the ring conductor between the network side and the subscriber side. Switches 12 and 14 have a predetermined threshold for which each switch remains open until said threshold is reached. Application of a test voltage greater than the threshold between the tip and ring pair causes switches 12 and 14 to conduct and provide an electrical current path through DC signature impedance 16. The basic test for isolating faults between network and subscriber sides is by measuring the signature between the tip, ring, and ground circuits to identify the faulty circuit. Thus it can be seen that using a DC voltage which ranges above and below the threshold can be used to isolate a fault on either the network or subscriber side of the MTU.

U.S. Pat. No. 4,529,847 issued Jul. 16, 1985 to DeBalko, U.S. Pat. No. 4,396,809 issued Aug. 2, 1983 to Brunssen, and U.S. Pat. No. 4,373,121 issued Feb. 8, 1983 to Sartori et al., disclose some embodiment of the MTU 8 and are herein incorporated by reference. It can be seen that the MTU 8 is well known in the art and can be practiced in various forms as evidenced by the aforementioned patents.

Another problem with the equipment/service dichotomy after the divestiture of the phone company is that equipment evolved with ringers having a substantially different AC impedance than conventional electromechanical ringers. The Federal Communications Committee (FCC) which governs communication services and equipment, has set forth under its Rules and Regulations, a preselect value for AC impedance known as a Ringer Equivalence Number (REN). One REN has a certain L-R-C impedance for which the electrical characteristics are known.

Figure 2:
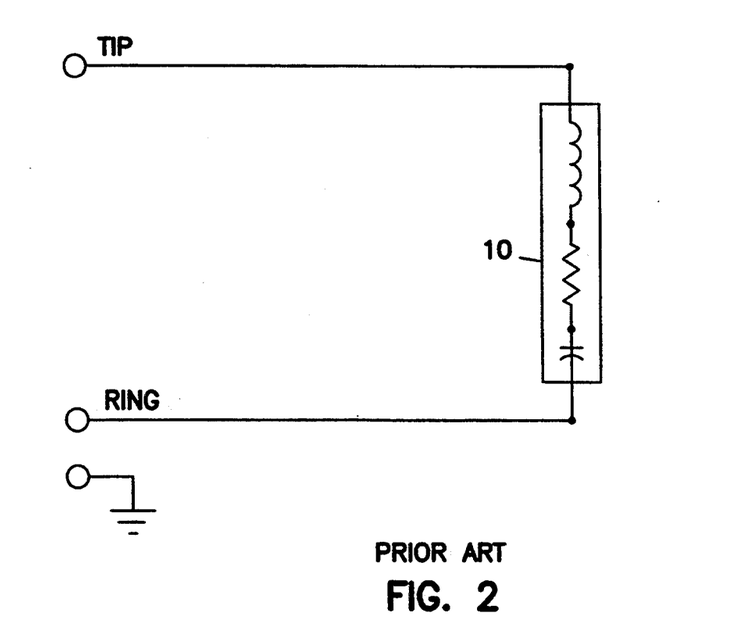
FIG. 2 is a prior art schematic diagram depicting a half-ringer circuit.

Reference is now made to FIG. 2 which depicts a device referred to as a "dummy" or "half ringer" 10. The half ringer 10 is attached across the tip and ring conductors at or near the demarcation point between the network and the subscriber. The half ringer 10 exhibits an impedance of 0.5 REN in accordance with Part 68 of the FCC Rules and Regulations, providing an AC signature useful in performing ringing current tests on the subscriber line.

While these systems and methods for testing AC and DC signatures have been used separately for a number of years, they have never been used collectively. They also suffer a number of problems including the uncertainty in verifying the identity of the subscriber loop under test. Ideally, the central office should be correctly coupled to the tip and ring pair of the subscriber loop under test. However, because of human error or intentional conduct to defraud the service provider of revenue, it is possible that the subscriber loop can be incorrectly wired. Thus, it can be seen that the central office could be under the mistaken belief that a subscriber loop was correctly tested. Therefore, it is important that diagnostic testing be verified in a reliable and an unobtrusive manner to the subscriber. This insures that the central office authenticates its results to protect the integrity of the testing.

It can be seen then that an improved system and method for testing equipment in a telephone network is needed that is reliable and that can be easily adapted to existing systems. It can also be seen that an improved system and method for testing equipment in a telephone network is needed which requires no human intervention for verifying the subscriber loop identity. It can also be seen that integration of both AC and DC signatures in a common unit is both economically and ideologically efficient.

SUMMARY OF THE INVENTION

To overcome the limitations in the prior art described above, and to overcome other limitations that will become apparent upon reading and understanding the present specification, the present invention in accordance with the principles set forth herein, discloses a system and method for telephone network testing wherein complete duplex diagnostic testing is performed. The system comprises a maintenance termination unit, a half-ringer having an AC impedance suitable for ringing current testing, and an identification response unit for verifying the identity of the subscriber loop. The method for telephone network testing includes ringing current testing, fault identification and location, transmissions measurements, noise measurements, and subscriber loop identification, all remotely accomplished from the local central office.

In one aspect of the present invention, means for providing an AC signature enable presently available ringing current tests to be utilized. This aspect of the present invention provides an impedance which produces a ringing current of known characteristics. Current flows back to the central office and is compared to a template of expected current for testing the continuity of the subscriber loop up to and including the demarcation point between the telephone network and the inside wiring of the subscriber.

In another aspect of the present invention, means for isolating the telephone network from the internal wiring of the subscriber loop are provided without effecting normal subscriber service. This aspect provides isolation between the network and subscriber when the service is inactive. An off-hook condition causes the isolation to break down and bridge the customer's inside wiring to the network providing transparent service between the central office and the customer. Without effecting normal subscriber service, the central office may also impress a voltage of preselect value across the tip and ring pair to breakdown the isolation and access a DC signature between the tip and ring terminals. The DC signature permits the central office to perform tests such as, but not limited to, Local Test Desk (LTD) and Mechanized Loop Tests (MLT and MLT-2).

In another aspect of the present invention, means for querying and verify the identity of the subscriber loop is provided. This aspect provides means for returning an unique identifying number assigned and associated with a particular subscriber loop in response to a query from the central office. The response may be triggered with a characteristic tone sent from the central office, by the activation of the MTU, by reversing the battery voltage, increasing the battery voltage or the like. The response unit may also include means for sending a test tone for additional diagnostic testing.

The synergy of providing AC and DC fault analysis coupled with means for identifying and verifying the subscriber loop, enables known diagnostic testing techniques to be utilized with a higher degree of reliability. It further enhances the integrity of the testing by sending a distinctive identification signal to verify that the intended subscriber loop is under test.

Another advantage of practicing the principals of the present invention is that unneeded field service trips are significantly reduced.

Therefore, a system and method is provided which can accommodate known subscriber loop testing without regard to the subscriber's equipment while also providing a duplex verification to improve reliability. Ringing current and DC fault testing may be accomplished even when a subscriber station having an electronic ringer is attached or even when a station is not attached.

These and various other advantages and features of novelty which characterize the invention are pointed out with particularity in the claims annexed hereto and forming a part hereof. However, for a better understanding of the invention, its advantages, and the objects attained by its use, reference should be made to the drawings which form a further part hereof, and to the accompanying descriptive matter, in which there is illustrated and described specific examples of the devices and methods in accordance with the principles of the present invention.

BRIEF DESCRIPTION OF THE DRAWINGS

Referring now to the drawings, which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Before describing, in detail, the particular system and method for network testing in accordance with principals of the present invention, it should be noted that the invention resides primarily in a novel structural combination of conventional circuits, and not in the particular detailed configuration thereof. Accordingly, the structure control and arrangement of these conventional circuits have been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. Thus, the illustrations in the figures do not necessarily represent the mechanical structural arrangement of the exemplary system, but are primarily intended to illustrate the major structural components in a convenient functional grouping, wherein the present invention may be more readily understood.

Figure 3:
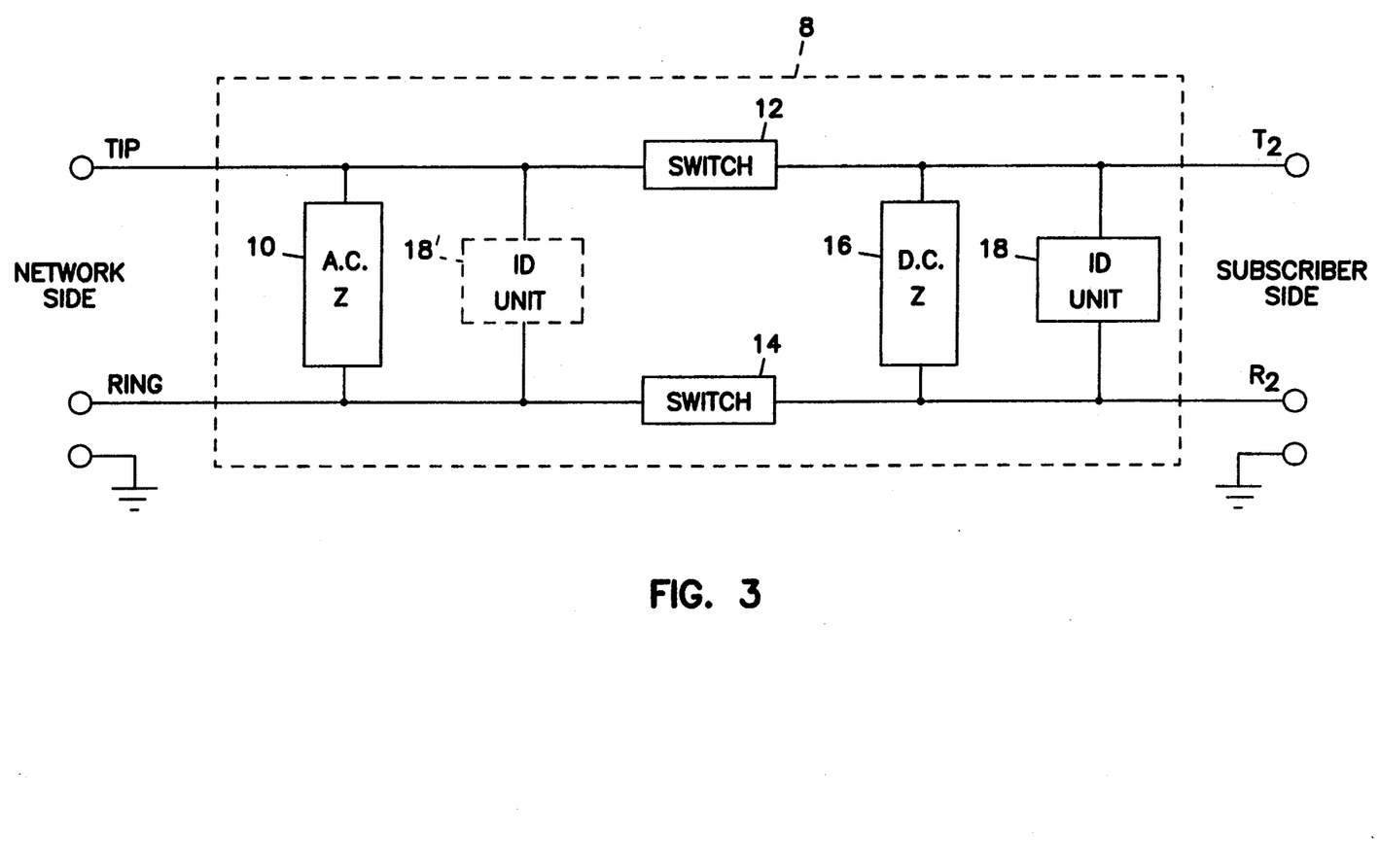
FIG. 3 is a schematic diagram depicting a circuit device in accordance with the principals of the present invention.

Reference is now made to FIG. 3 which depicts device 8 in accordance with the principles of the present invention. In the preferred embodiment, the device 8 is suitable for either indoor or outdoor mounting, being encapsulated with epoxy for providing a weatherproof environment.

An AC signature impedance 10 is disposed between the tip a half-ringer or and ring lines on the network side. In the preferred embodiment, the AC signature impedance 10 has a value of substantially 0.5 REN. Those skilled in the art will readily recognize other values for ring equivalency as set forth in Part 68 of the FCC Rules. The AC signature impedance 10 simulates the electrical characteristics of a station set ringer. The AC signature impedance 10 enables the central office to perform tests for AC signature analysis with or without a telephone set connected to the subscriber line between $T_2$ and $R_2$. The AC signature impedance 10 comprises a resistor, a capacitor, and an inductor, or combination thereof, coupled in series across the tip and ring lines on the network side, to reflect a characteristic impedance of a station set ringer.

The AC signature impedance 10 enables ringing current to be tested by the central office at the demarcation point between the network and the subscriber loop. The test is typically initiated by the central office when an originating calling party abandons the call after six seconds of ringing. However, in accordance with the principles of the present invention, the central office may also systematically call a subscriber loop to determine whether the measured ringing current matches a predetermined template for current. Incorporation of an identification response unit having an unique ID particular to the select subscriber loop, enables the central office to verify its identity. If a mismatch occurs between the measured current and the template, isolation procedures can then be initiated to determine whether the failure has occurred in the network trunks or in the specific subscriber loop.

Switches 12 and 14 each comprise a bilateral, voltage sensitive switch which allow the connection of the subscribers inside wiring to the telephone network. When the subscriber goes off-hook, switches 12 and 14 go into a low impedance state allowing either incoming or outgoing voice, data or other transmission. It should be noted that many know expedients for switches 12 and 14 are known, including but not limited to, silicon controlled rectifiers (SCR) connected in an inverse parallel relationship, or a TRIAC. Those skilled in the art will readily recognize other types of switches for elements 12 and 14.

A DC signature impedance 16 is disposed between $T_2$ and $R_2$ on the subscriber side providing a non-service affecting DC impedance when switches 12 and 14 are activated. An example of the DC signature impedance 16 is best described in U.S. Pat. No. 4,529,847 issued Jul. 16, 1985 to DeBalko, herein incorporated by reference.

To determine the DC signature at the demarcation point, an automated local test desk (LTD) or a mechanized loop test (MLT) or (MLT-2) is applied to the tip and ring from the central office. The tests comprise application of a DC voltage of sufficient amplitude and correct polarity across the tip and ring pair to cause switches 12 and 14 to close and for a DC current to flow. The DC voltage is selectively reversed in polarity so that current flow is blocked by impedance 16. The selective polarity switching produces a distinctive DC current signature. By alternating between the conductive and non-conductive modes, it can be determined whether or not the expected DC signature is present at the demarcation point of the subscriber's service. If the fault occurs on the subscriber side, a periodic signal will be observed when the voltage polarity is reversed. If a network fault is present, a steady signal will be observed with both polarities of the applied voltage. The test determines resistive faults between tip and ground, ring and ground, tip and ring, as well as opens between the tip and ring pair. From the central office, the identity of the subscriber loop can be verified by querying the ID unit 18 or 18' described in more detail hereinbelow. Thus it can be seen that the DC signature impedance 16 and the ID unit 18 or 18' can be remotely activated and deactivated from the central office without a physical presence at the demarcation point between the network and the subscriber.

Figure 4:
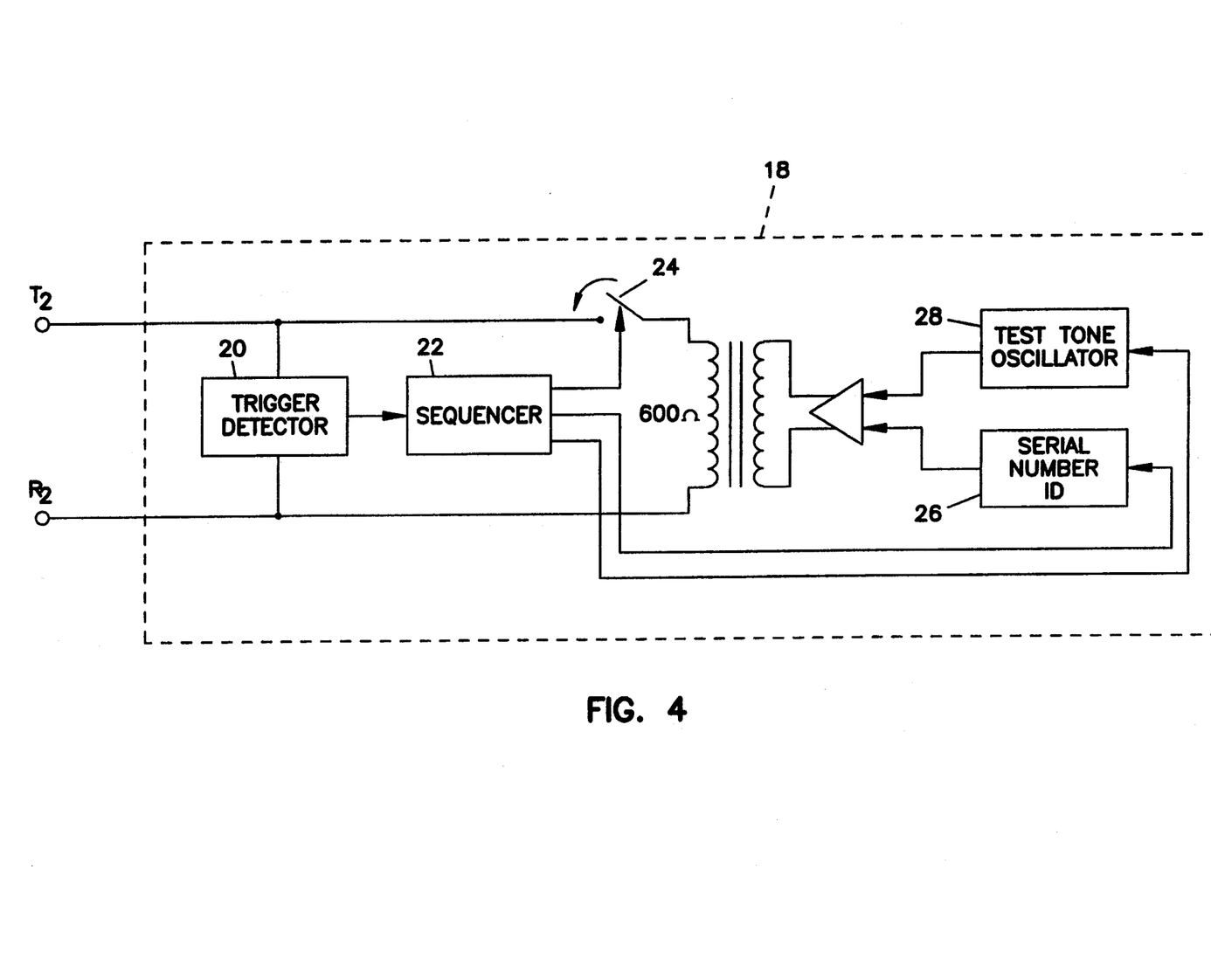
FIG. 4 is a diagram in more detail of the identification response unit depicted FIG. 3.

Reference is now made to FIG. 4 which depicts a schematic diagram of the preferred embodiment for the identification response unit 18 depicted FIG. 3. Trigger detector 20 monitors the subscriber line between $T_2$ and $R_2$. When switches 12 and 14 are activated, battery voltage from the central office will present between $T_2$ and $R_2$ for powering the ID unit 18 and possibly acting as the triggering event for trigger detector 20. Alternatively, the central office may apply a pre-selected trigger condition, such as but not limited to, a characteristic tone or an increase in battery voltage. Trigger detector 20 activates sequencer 22 to close switch 24 and terminate the line between $T_2$ and $R_2$ to provide an off-hook impedance. The central office senses the off-hook impedance as a signal that the ID unit 18 has responded. Next, sequencer 22 cycles serial number unit 26 to send an unique ID code over $T_2$ and $R_2$. Switches 12 and 14 being in the conductive state, allow the code to be transmitted back to the central office. Additionally, sequencer 22 may cycle oscillator 28 to send a test tone over $T_2$ and $R_2$.

Figure 5:
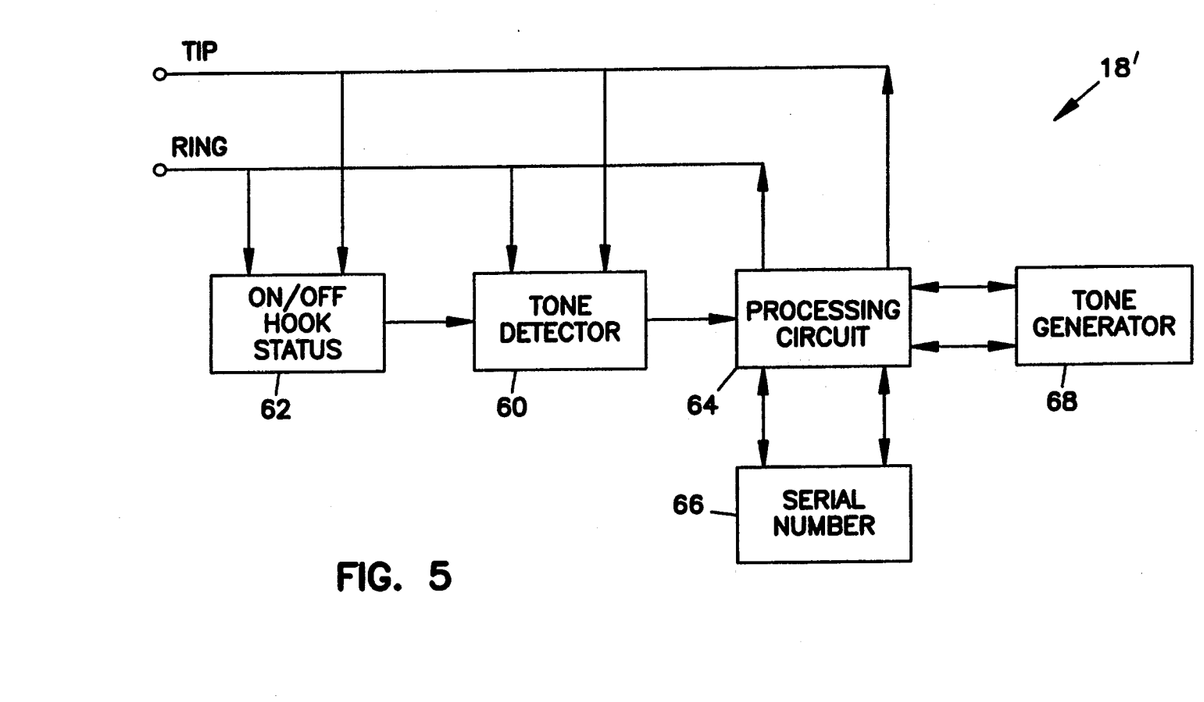
FIG. 5 is a diagram of an alternative embodiment of the identification response unit in accordance with the principals of the present invention.

Reference is now made to FIG. 5 which depicts an alternative embodiment of the identification response unit 18' in accordance with the principals of the present invention. In the alternative embodiment, response unit 18' is coupled directly across the tip and ring lines on the network side. The response unit 18' in its inactive state displays a very high impedance across the tip and ring lines and is therefore transparent to normal telephone transmissions. The operating power is supplied from the central office battery voltage on the tip and ring lines. Serial number identification may be initiated by the central office with a characteristic AC tone having a predetermined frequency without triggering switches 12 and 14. Tone detector 60 is preset to recognize the predetermined AC tone when the subscriber loop is in an on-hook position. On/off hook status detector 62 disables tone detector 60 when it senses an off-hook condition. Detector 60 applies power to a processing circuit 64 in response to the predetermined AC tone, causing it to terminate the loop (i.e. provide an off-hook status). The processing circuit 64 retrieves an unique ID code from serial number unit 66 and transmits a data stream representing the unique ID code over the tip and ring pair. In the preferred embodiment, the code is ASCII coded and transmitted at frequencies compatible with standard modems. The processing circuit 64 may also retrieve a tone signal from a tone generator 68 for transmission over the tip and ring pair.

Figure 6:
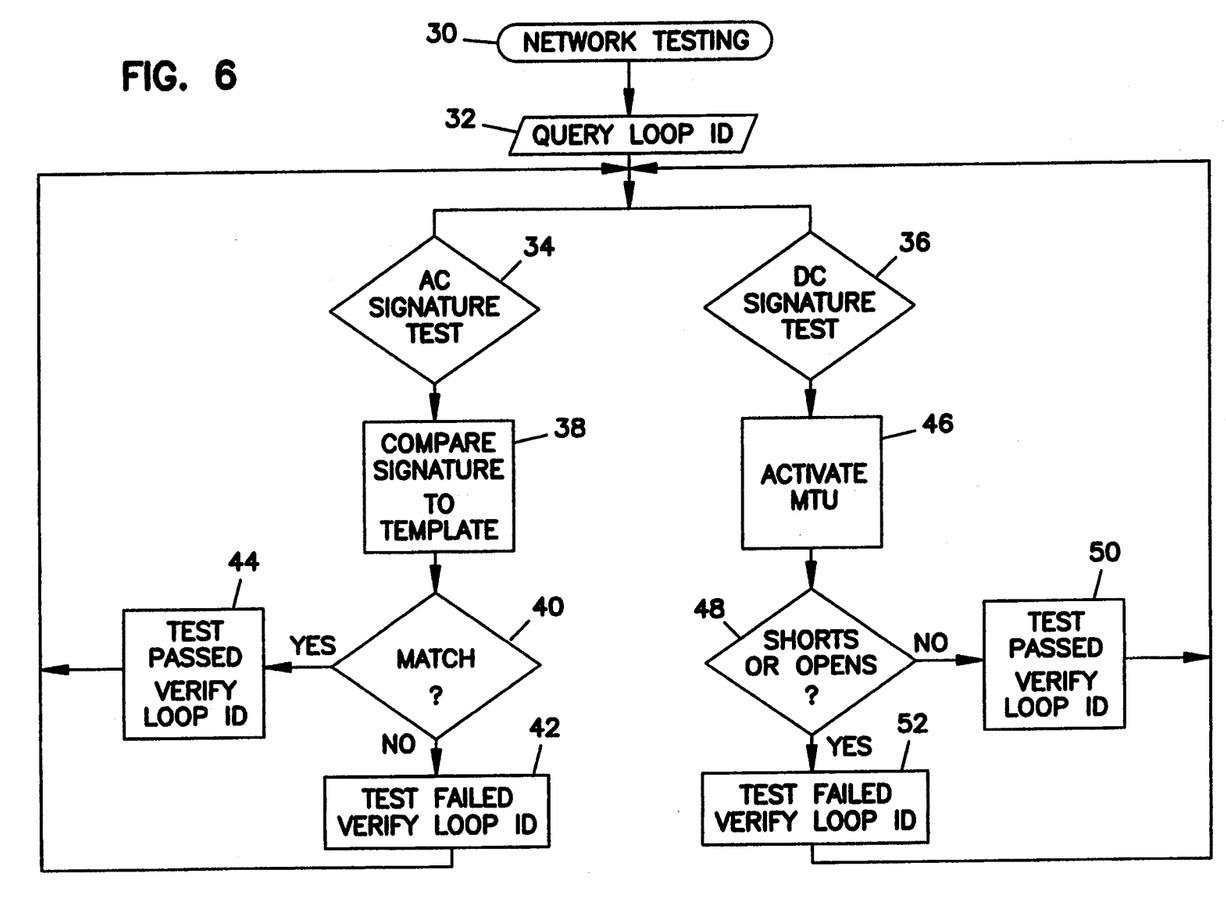
FIG. 6 is a flow diagram of a method of testing in accordance with the principles of the present invention.

Reference is now made to FIG. 6 which depicts a flow diagram of a method of testing in accordance with the principles of the present invention. A network testing method 30 is employed in the central office with the use of an automated computer system. At step 32 in the method, the subscriber loop is queried for its unique ID number. At steps 34 and 36 respectively, a choice of AC or DC signature testing is made. At step 34, the AC signature is measured by impressing an AC voltage of sufficient amplitude and proper frequency across the select subscriber loop without ringing the customer's telephone set. At step 38, the measured AC signature is compared to a preferred AC current template, such as, but not limited to, one which flows through an impedance of 0.5 REN. If a substantial match is obtained at step 40, the AC signature test is considered passed. At step 44, the subscriber loop ID is verified and logged in a system log for maintenance reports. At step 42, the test is deemed failed if an uncharacteristic signature is measured. The system queries and verifies the subscriber loop ID for logging and reports out the trouble ticket.

The DC signature test at step 36 may include, but is not limited to, the LTD and MLT, MLT-2 tests. At step 46 the maintenance termination unit (MTU) comprising voltage sensitive switches 12, 14 are activated by applying the appropriate amplitude and polarity of the voltage across the tip and ring pair. At step 48, the DC signature impedance 16 is analyzed to determine whether shorts, opens or highly resistive connections exist. If no abnormal impedance exists at step 50, the test is deemed passed. The loop ID is queried, verified, and logged in a maintenance report. If a fault is found, at step 52 the test is deemed to have failed. The loop ID is queried, verified, and logged in a maintenance report. The information is then reported out for correction.

The foregoing description of the preferred embodiment of the invention has been presented for the purposes of illustration and description. It is not intended to be exhaustive or to limit the invention to the precise form disclosed. Any modifications or variations are possible in light of the above teaching. It is intended that the scope of the invention be limited not by this detailed description, but rather by the claims amended hereto.

What is claimed is:

1. A system for testing a telephone network between a central office and an individual subscriber loop therein, the system comprising:
    (a) means, disposed at a demarcation point between the network and the subscriber loop and remotely activated and deactivated from the central office, for isolating the network from the subscriber loop without effecting normal service, wherein an off-hook condition on the subscriber loop breaks down the means for isolating and bridges the subscriber loop to the network to provide transparent service therebetween;
    (b) means, coupled across the subscriber loop at the demarcation point, for providing an AC signature impedance so that the subscriber loop's operation can be tested from the central office; and
    (c) means, disposed at the demarcation point between the network and the subscriber loop and remotely activated and deactivated from the central office, for selectively sending a unique code, assigned and associated with the subscriber loop, to the central office.

2. A system for testing a telephone network as recited in claim 1 wherein the means for selectively sending further comprises:
    (1) a trigger detector, disposed across the subscriber loop, for sensing triggering events and initiating a response; and
    (2) a sequencer for sequencing a switch for terminating the subscriber loop and cycling a serial number unit for sending the unique ID code.

3. A system for testing a telephone network as recited in claim 2 further comprising an oscillator, responsive to the sequencer, for sending a test tone.

4. A system for testing a telephone network as recited in claim 1 wherein the means for selectively sending further comprises:
    (1) a tone detector for recognizing a predetermined triggering tone; and
    (2) a processing circuit, responsive to the tone detector, for providing an off-hook status and retrieving the unique ID code, the processing circuit transmitting a data stream representing the unique ID code.

5. A system for testing a telephone network as recited in claim 4 further comprising a tone generator, responsive to the processing circuit, for transmitting a tone for diagnostic testing.

6. A system for testing a telephone network as recited in claim 4 wherein the data stream is ASCII coded and is transmitted at frequencies compatible with standard modems.

7. A system for testing a telephone network as recited in claim 1 wherein the means for isolating further includes a DC signature impedance disposed across the subscriber loop.

8. A system for testing a telephone network as recited in claim 7 wherein the DC signature impedance is tested by a Local Test Desk.

9. A system for testing a telephone network as recited in claim 7 wherein the DC signature impedance is tested by a Mechanized Loop Test.

10. A system for testing a telephone network as recited in claim 1 wherein the means for querying and verifying the identity of the subscriber loop is triggered with a characteristic tone sent over the network.

11. A system for testing a telephone network as recited in claim 1 wherein the means for querying and verifying the identity of the subscriber loop is triggered by activation of the application of a voltage greater than a predetermined threshold.

12. A system for testing a telephone network as recited in claim 1 wherein the means for querying and verifying the identity of the subscriber loop further comprises means for sending a test tone for additional diagnostic testing.

13. In a telephone network, at least one subscriber line having a tip and a ring terminal coupled to a diagnostic device at a demarcation point between the telephone network and the subscriber line inside wiring, the device comprising:
    (a) a half ringer, having a first terminal coupled to the tip terminal and a second terminal coupled to the ring terminal at the demarcation point, for providing an ac impedance to satisfy a ringing current test originating in a central office;
    (b) a maintenance terminal unit, coupled to the subscriber line having a first terminal coupled to the tip terminal, a second terminal coupled to the ring terminal, a third and fourth terminal coupled to a tip and ring terminal at the demarcation point, for providing a dc signature for fault testing and for isolating the subscriber station from the network in response to the station being on-hook, wherein the maintenance terminal unit provides continuity between the first and third terminals and the second and fourth terminals respectively in response to an off-hook condition; and
    (c) an identifying code response unit, coupled across the tip and ring terminals at the demarcation point and responsive to a trigger condition, for terminating the subscriber line, and for sending an identifying code over the subscriber line.

14. A device as recited in claim 13 wherein the identifying code response unit further includes means for sending a test tone signal over the subscriber line.

15. A device as recited in claim 13 wherein the half ringer has an impedance value of substantially 0.5 REN.

16. A device as recited in claim 13 wherein the maintenance terminal unit further comprises a first and a second bilateral voltage sensitive switch disposed between the first and third terminals and the second and fourth terminals respectively for connecting the subscriber loop to the network.

17. A device as recited in claim 16 wherein the first and the second bilateral voltage sensitive switches are a pair of silicon controlled rectifiers connected in an inverse parallel relationship.

18. A device as recited in claim 16 wherein the first and the second bilateral voltage sensitive switches are a TRIAC.

* * * * *